(12) United States Patent
McKinlay (10) Patent No.: US 11,186,126 B2
(45) Date of Patent: Nov. 30, 2021

(54) TYRE CAVITY NOISE ABSORBER

(71) Applicant: Bentley Motors Limited, Crewe (GB)

(72) Inventor: Andrew James McKinlay, Crewe (GB)

(73) Assignee: Bentley Motors Limited, Crewe (GB)

( * ) Notice: Subject to any disclaimer, the term of this patent is extended or adjusted under 35 U.S.C. 154(b) by 230 days.

(21) Appl. No.: 15/031,642

(22) PCT Filed: Oct. 24, 2014

(86) PCT No.: PCT/GB2014/053179
§ 371 (c)(1),
(2) Date: Apr. 22, 2016

(87) PCT Pub. No.: WO2015/059493
PCT Pub. Date: Apr. 30, 2015

(65) Prior Publication Data
US 2016/0303922 A1    Oct. 20, 2016

(30) Foreign Application Priority Data
Oct. 24, 2013    (GB) ..................................... 1318834

(51) Int. Cl.
*B60C 19/00* (2006.01)
*B60B 21/12* (2006.01)

(52) U.S. Cl.
CPC ............ *B60C 19/002* (2013.01); *B60B 21/12* (2013.01); *B60B 2900/133* (2013.01); *B60Y 2200/10* (2013.01)

(58) Field of Classification Search
CPC ........ B60C 19/002; B60C 5/002; B60C 17/04
See application file for complete search history.

(56) References Cited

U.S. PATENT DOCUMENTS 4,126,966 A  *  11/1978  Lobell .................... E06B 7/231
                                                      428/124
4,679,975 A  *  7/1987  Leistner ................. F16B 15/08
                                                      206/343

(Continued)

FOREIGN PATENT DOCUMENTS

DE       19820590 A1    11/1999
DE       10151474    *   5/2002

(Continued)

OTHER PUBLICATIONS

Machine translation of JP 8-207508, 1996.*

(Continued)

*Primary Examiner* — Justin R Fischer
(74) *Attorney, Agent, or Firm* — Tarolli, Sundheim, Covell & Tummino LLP; John A. Yirga, Esq.

(57) ABSTRACT

A tyre cavity noise absorber comprising a body 1 of sound absorbing material with an outer protective cover 3. The body of sound absorbing material is intended to be mounted to a wheel 2 of a wheel and tyre 6 assembly so that a surface of the body is exposed in a tyre cavity of the wheel and tyre assembly. The outer protective cover only partially covers said surface of the body of sound absorbing material such that the cover protects the body of sound absorbing material from a bead 7 of a tyre as a tyre is fitted to, or removed from, the wheel and the uncovered parts of the body of sound absorbing material are free to absorb sound.

14 Claims, 7 Drawing Sheets

(56) References Cited

U.S. PATENT DOCUMENTS

| | | | | |
|---|---|---|---|---|
| 4,681,147 | A * | 7/1987 | Hugele | B60C 17/06 |
| | | | | 152/158 |
| 4,960,184 | A * | 10/1990 | Woodward | E04B 1/86 |
| | | | | 181/287 |
| 6,216,758 | B1 * | 4/2001 | Chen | B60B 1/041 |
| | | | | 152/379.4 |
| 6,244,314 | B1 | 6/2001 | Dodt et al. | |
| 6,390,563 | B1 | 5/2002 | Haverkamp et al. | |
| 6,463,974 | B1 * | 10/2002 | Hellweg | B60C 17/04 |
| | | | | 152/400 |
| 6,598,636 | B1 | 7/2003 | Schurmann et al. | |
| 7,717,146 | B2 * | 5/2010 | Yukawa | B60C 19/002 |
| | | | | 152/151 |
| 2011/0000596 | A1 | 1/2011 | Sachdev et al. | |
| 2014/0034204 | A1 | 2/2014 | Sakakibara et al. | |

FOREIGN PATENT DOCUMENTS

| | | | |
|---|---|---|---|
| EP | 282337 | * | 9/1988 |
| EP | 0663306 A3 | | 11/1995 |
| EP | 1253025 | * | 10/2002 |
| GB | 1481163 | * | 7/1977 |
| GB | 2122256 | * | 1/1984 |
| GB | 2483255 A8 | | 7/2012 |
| JP | H04159101 | | 6/1992 |
| JP | 08-58306 | * | 3/1996 |
| JP | 8-207508 | * | 8/1996 |
| JP | 2000351302 | | 12/2000 |
| JP | 2002512913 | | 5/2002 |
| JP | 2002307905 | | 10/2002 |
| JP | 2005-205937 | * | 8/2005 |
| WO | WO 2009/124182 A1 | | 10/2009 |

OTHER PUBLICATIONS

Machine translation of JP 8-58306, 1996.*
Machine translation of JP 2005-205937, 2005.*
International Search Report dated Apr. 2, 2015 for International Application No. PCT/GB2014/053179. (2 pages).
Chinese Third Office Action to the corresponding U.S. application dated Mar. 5, 2016 and English Translation (4 pages).
Japanese Office Action to the corresponding U.S. application dated Feb. 13, 2018 (12 pages).
English translation of Japanese Patent No. JPH04159101 (4 pages).
English translation of Japanese Patent No. JP2002307905 (14 pages).

* cited by examiner

TYRE CAVITY NOISE ABSORBER

CROSS REFERENCES TO RELATED APPLICATION

The present application is a 35 U.S.C. 0 371 National Stage Patent Application claiming priority to International PCT Application Serial No. PCT/GB2014/053179 having an International filing date of Oct. 24, 2014 and that was published on Apr. 30, 2015 under international publication number WO 2015/059493, which claims priority to Great Britain Patent Application Serial No. 1318834.7 that was filed on Oct. 24, 2013. This Application claims priority to and incorporates by reference the above-identified applications in their entireties for all purposes.

TECHNICAL FIELD OF THE INVENTION

The present invention relates to a tyre cavity noise absorber, to a wheel and tyre assembly comprising a tyre cavity noise absorber and to a vehicle comprising a wheel and tyre assembly comprising a tyre cavity noise absorber.

BACKGROUND TO THE INVENTION

A pneumatic wheel and tyre assembly, when inflated, is an acoustically resonant toroidal structure with, in the case of automobile wheels, a cavity frequency typically around 200 Hz. Resonant vibration results from exciting a standing wave in the air-filled torus by driving an automobile over a coarse road surface, for example of concrete or asphalt containing large stones. The resultant cavity noise may be transmitted to the interior of the vehicle by either airborne or structure-borne transfer paths. The amplitude of the noise may be sufficient to cause discomfort to the vehicle's passengers, and may cause a reduction in the perceived quality of the vehicle.

Tyre cavity noise may be controlled by modifying the forcing function, transfer functions or response functions in the vehicle. The most effective intervention typically is in the forcing function i.e. in the tyre cavity itself. To this end it is known to introduce a cavity noise absorber into a pneumatic tyre which attenuates the cavity resonance either by dividing the cavity space to prevent the formation of a standing wave, or by absorbing the energy of a standing wave in an acoustic damping material.

Conventional tyre cavity noise absorbers suffer a number of disadvantages. Some are mounted to the inside of the circumferential wall of a tyre. In this position they interfere with the deployment of liquid puncture repair systems, which are now increasingly provided in place of a spare wheel for automobiles to reduce both cost and vehicle mass. Others are mounted to the outside of the wheel (also known as a rim), and in this position they can interfere with the process of fitting a tyre to the wheel and they can be damaged or dislodged by that process. They can also detach from the surface of the wheel when the wheel is in use on a moving vehicle and rotates at high speed.

It is an object of embodiments of the present invention to address some or all of these problems.

SUMMARY OF THE INVENTION

According to a first aspect of the invention there is provided a tyre cavity noise absorber comprising a body of sound absorbing material intended to be mounted to a wheel of a wheel and tyre assembly so that a surface of the body is exposed in a tyre cavity of the wheel and tyre assembly, wherein the body of sound absorbing material is provided with an outer protective cover formed from spaced apart strips which, together, only partially cover said surface of the body of sound absorbing material, such that the cover protects the body of sound absorbing material from a bead of a tyre as the tyre is fitted to, or removed from, the wheel and the uncovered parts of the body of sound absorbing material are free to absorb sound.

Provision of a partial cover permits the absorber to be installed on the wheel, because the cover protects the absorber from damage when a tyre is fitted to or removed from the wheel, without significantly impairing the sound absorbing properties of the absorber. As the absorber is mounted to the wheel it will not interfere with the deployment of a liquid puncture repair.

The outer protective cover may cover anywhere between 30% and 60% of said surface of the body of sound absorbing material. The outer protective cover may cover about 50% of said surface of the body of sound absorbing material. This extent of coverage has been found to be sufficient to adequately protect the sound absorbing material from a bead of a tyre without significantly impairing the ability of the body to absorb sound.

The outer protective cover may be wholly or partially secured on the said surface of the body of sound absorbing material. The outer protective cover may be bonded to the body of sound absorbing material, such as with an adhesive.

At least part of the outer protective cover, for example at least one strip, may extend from one lateral edge of said surface of the body of sound absorbing material to an opposite lateral edge of said surface of the body of sound absorbing material. Each lateral edge of the surface may be intended to lie adjacent, or abut, the surface of a wheel to which the body of sound absorbing material is intended to be mounted. Thus, the cover may protect the body of material over the entire path of a tyre bead over the material as the tyre is fitted to or removed from the wheel.

The outer protective cover may comprise a sheet material. The outer protective cover may comprise a flexible material. The outer protective cover may comprise a substantially impermeable material. The outer protective cover may comprise a plastics material.

Part of the protective cover may be affixed to the body of sound absorbing material and its remaining length may be free. When the tyre cavity noise absorber is in use on a wheel, this free part may be affixed to the wheel in order to help retain the body of sound absorbing material relative to the wheel. This free part may also extend sufficiently close to an axial side of the wheel so that a bead of a tyre being fitted to or removed from a wheel will make first contact with this free part of the protective cover. This helps prevent damage to, or the dislodging of, the body of sound absorbing material, in particular by ensuring that the tyre bead rides over the cover, and does not dislodge it.

The strips of the outer protective cover may be strips of cover material.

The strips may be of substantially equal size. The strips may be of substantially equal shape. The strips may be elongate and may be substantially rectangular. The strips may be evenly spaced apart. The strips may be substantially parallel. The body of sound absorbing material may be elongate and the strips may extend in a direction generally at right angles to a long axis of the body of sound absorbing material. The strips may be spaced apart along the length of the body of sound absorbing material. Adjacent strips may be spaced apart by a distance substantially equal to, or at least as wide as, the width of a strip, along the length of the body.

Each strip may form a sheet. Each strip may provide a substantially continuous protective surface. That is to say, the strip is substantially non-perforated.

A strip may be formed by a single piece of cover material. A strip may be formed by two or more pieces of cover material. These pieces may overlap around the substantially thickest part of the body of sound absorbing material.

The outer protective cover may present a smooth surface. The surface may be smoother than said surface of the body of sound absorbing material. When in use on a wheel, a bead of a tyre may ride across the smooth surface of the outer protective cover when a tyre is being fitted to or removed from the wheel. The outer protective cover may be sufficiently thick so that in such a circumstance contact and/or friction between a bead of a tyre and the uncovered parts of the body of sound absorbing material may be reduced compared to an arrangement with no cover.

There may be another cover between the outer protective cover and the body of sound absorbing material. This cover may partially cover the body of sound absorbing material. This cover may substantially wholly cover the body of sound absorbing material. This cover may comprise a substantially acoustically transparent material. This cover may comprise a substantially impermeable material.

The body of sound absorbing material may have one substantially flat side and one substantially continuously curved convex side opposite the substantially flat side. The body of sound absorbing material may be substantially semi circular or D-shaped in cross section. Other cross-sections are possible.

In use the substantially flat side may be mounted to the outer circumferential surface of a wheel.

The body of sound absorbing material may be formed from a porous material. The body of sound absorbing material may comprise a foam material, such as an open celled foam material. The or each body of sound absorbing material may be self-supporting, and may be formed from a single piece of material.

According to another aspect of the invention there is provided a wheel intended to be fitted with a pneumatic tyre, the wheel being provided with a tyre cavity noise absorber according to the first aspect of the invention mounted to the wheel so that it is disposed in a tyre cavity when a tyre is fitted to the wheel.

The body of sound absorbing material may be bonded to the outer circumferential surface of the wheel using an adhesive. The entire surface of the body of sound absorbing material exposed to the tyre cavity may be spaced from the tyre.

The body may extend around a part of the circumference of the wheel. The body may extend around the entire circumference of the wheel. The body may be formed from a single length of material arranged end-to-end. The body may be arranged as a continuous loop. A plurality of bodies may be spaced apart around the circumference of the wheel. They may be evenly spaced apart circumferentially around the wheel in order to maintain balance of the wheel. They may contact one another. A plurality of bodies may be beneficial where one of the bodies of sound absorbing material is damaged or dislodged.

The wheel may be mounted to a vehicle, such as an automobile.

According to another aspect of the invention there is provided a method of providing a wheel and tyre assembly including the steps of:

providing a wheel;

providing a tyre cavity noise absorber according to the first aspect of the invention and affixing it to an external circumferential surface of the wheel; and fitting a tyre to the wheel by urging a bead of the tyre onto the wheel passing it over the tyre noise cavity absorber, deforming the tyre cavity noise absorber.

The tyre cavity noise absorber may be bonded to the wheel with an adhesive. The tyre cavity noise absorber may not be displaced when the tyre is fitted to the wheel.

The method may further include the step of removing the tyre from the wheel.

DETAILED DESCRIPTION OF THE INVENTION

In order that the invention may be more clearly understood embodiments thereof will now be described, by way of example only, with reference to the accompanying drawings, of which.

Referring to FIGS. 1 to 6, a tyre cavity noise absorber comprises a body 1 of sound absorbing material. The body 1 is formed from a resiliently flexible open cell foamed material. Suitable foam materials include polyurethane ester and polyurethane ether foams although any suitable sound absorbing material, such as a porous material or one comprising activated carbon could be used. The body 1 of sound absorbing material is arranged to be mounted on the outer circumferential surface of a wheel 2 of a wheel and pneumatic tyre assembly. Such wheels are also referred to as rims.

Figure 1:
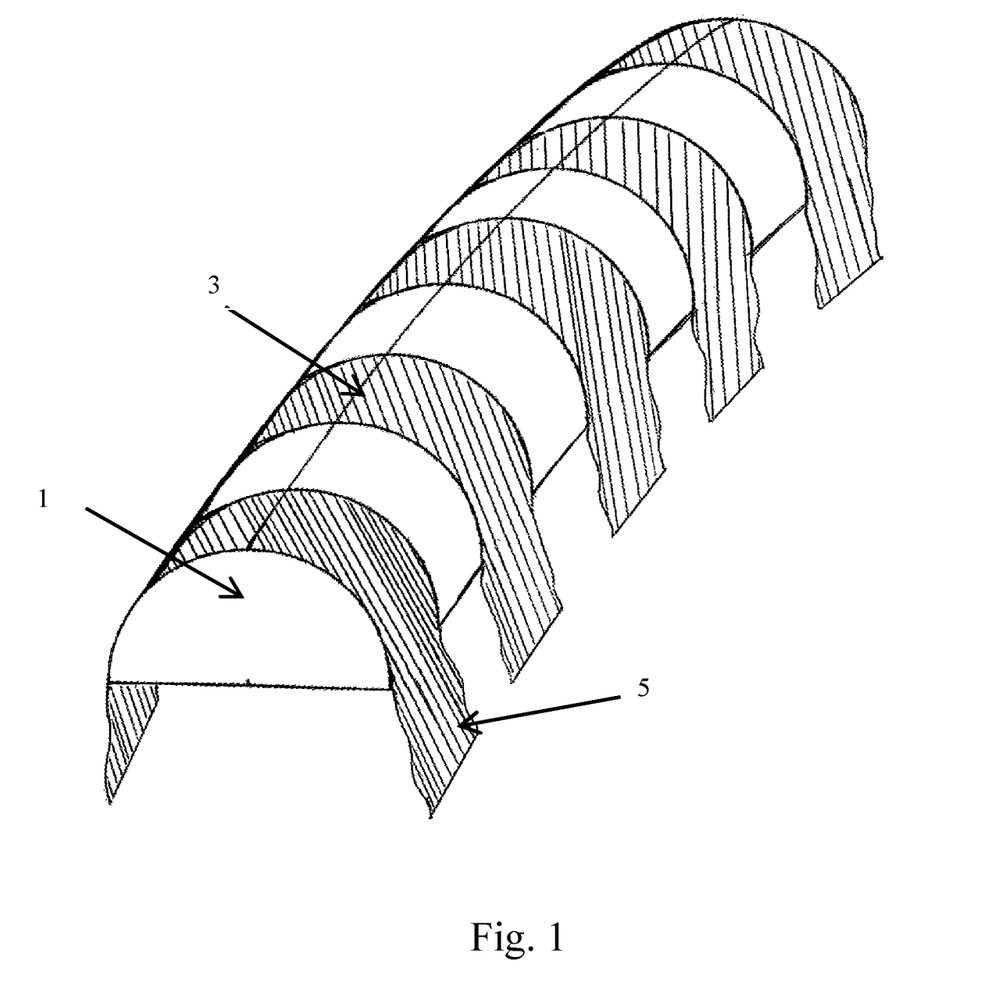
FIG. 1 is a perspective view of an embodiment of a tyre cavity noise absorber.
Figure 2:
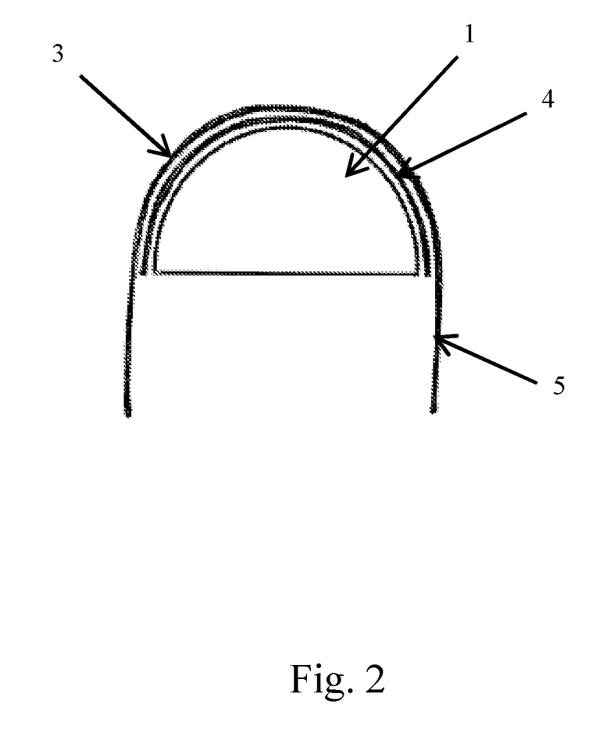
FIG. 2 is a transverse cross section through the absorber of FIG. 1.

The body 1 is elongate and substantially semi-circular in transverse cross-section, having one substantially flat side and one substantially continuously curved convex side opposite the flat side. The body 1 has two lateral edges where the substantially curved convex side of the body 1 meets the substantially flat side of the body 1.

The substantially convex side of the body 1 is partially covered by an outer protective cover 3 formed from several elongate strips of flexible plastics sheet material. Suitable plastics sheet materials include polyethylene terephthalate (PET), polyurethane ester film and polyurethane ether film. The plastics sheet material presents a smooth outer surface.

At substantially evenly spaced apart positions on the body 1, respective elongate substantially rectangular strips of cover material extend transversally across the substantially convex side of the body 1, from one lateral edge of the body 1 to the other. Each strip is approximately the same size and shape and separated from adjacent strips by a distance substantially equal to the width of a strip. As such, approximately 50% of the body 1 is covered and approximately 50% of the body 1 is uncovered.

Each strip is bonded to the body 1 with an adhesive 4 and extends past both lateral edges of the body 1 by a length approximately equal to half the width of the body 1, forming free tail 5 of cover material extending from each lateral edge of the body 1 respectively. Suitable adhesives include acrylic, modified acrylic and modified dispersion acrylic adhesives. Other suitable adhesives may be used. The adhesive 4 may be provided in any suitable form, such as a liquid or alternatively a single or double sided tape.

Figure 3:
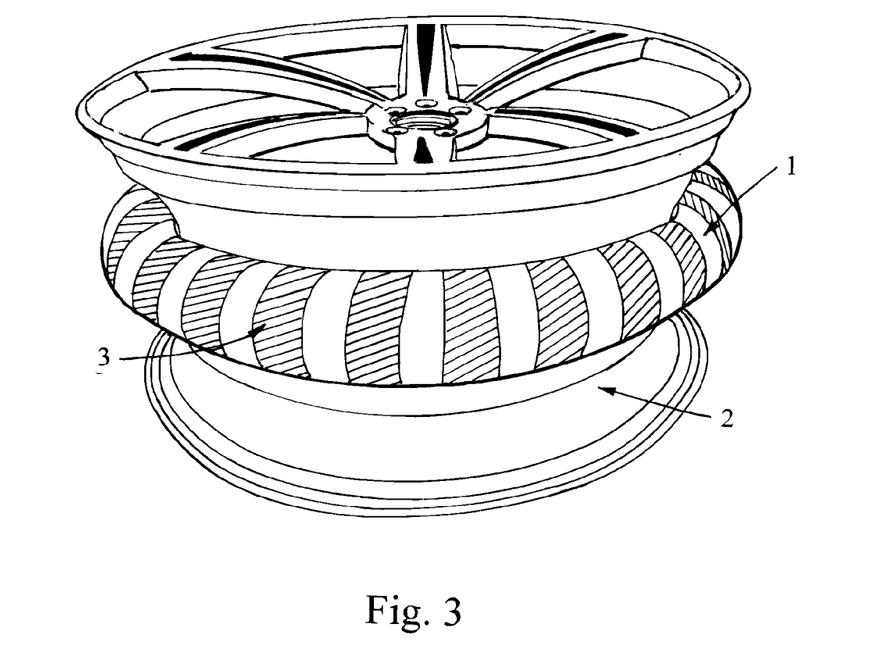
FIG. 3 is a perspective view of a wheel with the tyre cavity noise absorber of FIG. 1 mounted thereto.
Figure 4:
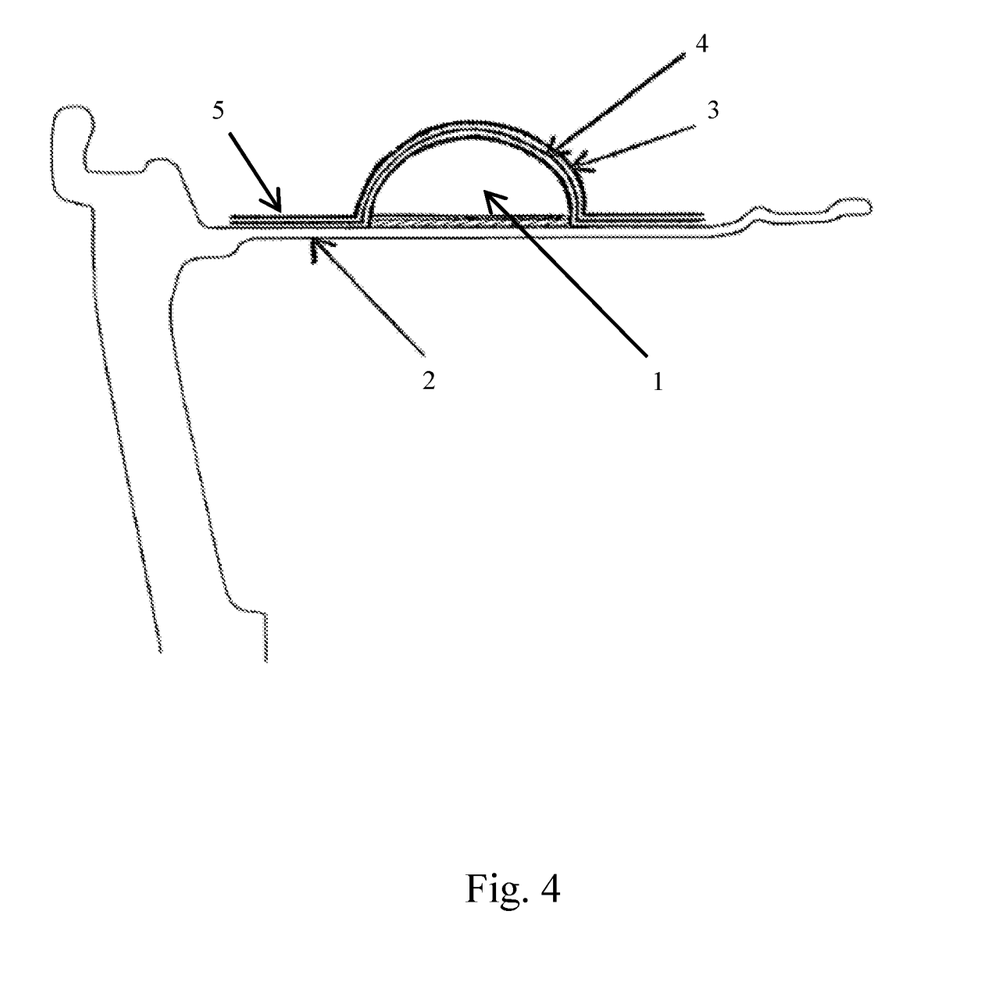
FIG. 4 is a transverse cross section through part of the wheel of FIG. 3.
Figure 5:
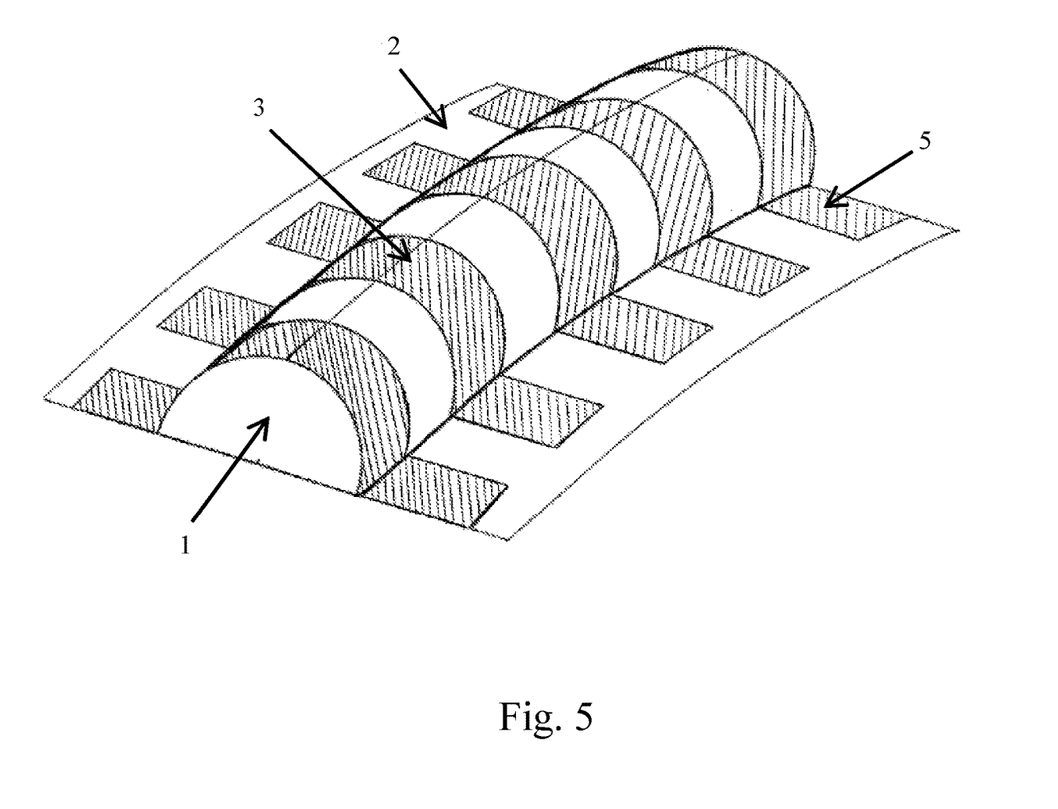
FIG. 5 is a partial perspective view of the wheel of FIG. 3.

In use, the substantially flat side of the body 1 is bonded to the outer circumferential surface of a wheel 2, with adhesive 4, and positioned generally centrally between opposite axial sides of the wheel 2. The substantially convex side of the body 1 extends into the cavity that is formed between a tyre and the wheel 2 when a pneumatic tyre is fitted to the wheel 2. The body 1 extends around the entire circumference of the wheel 2 and is formed from a single length of material arranged end-to-end or as a continuous loop. Alternatively one or more shorter lengths of absorber could be formed and mounted to the wheel 2. Where multiple lengths are employed they may be spaced apart, or contact one another. Where spaced apart bodies are used they should be evenly spaced circumferentially around the wheel 2 in order to maintain balance of the wheel 2.

The tails 5 of cover material extending from the lateral edges of the body 1 are bonded to the outer circumferential surface of the wheel 2 on the lateral side of the body 1 from which they extend, with an adhesive 4. Thus, the cover material serves to retain the body 1 on the wheel 2 in addition to the body 1 being bonded directly to the wheel 2, and increases the overall bonding area associated with retaining the body 1 on the wheel 2. This helps prevent the body 1 from detaching from the wheel 2 when the wheel 2 is in use on a vehicle, and may rotate at high speed.

Figure 6:
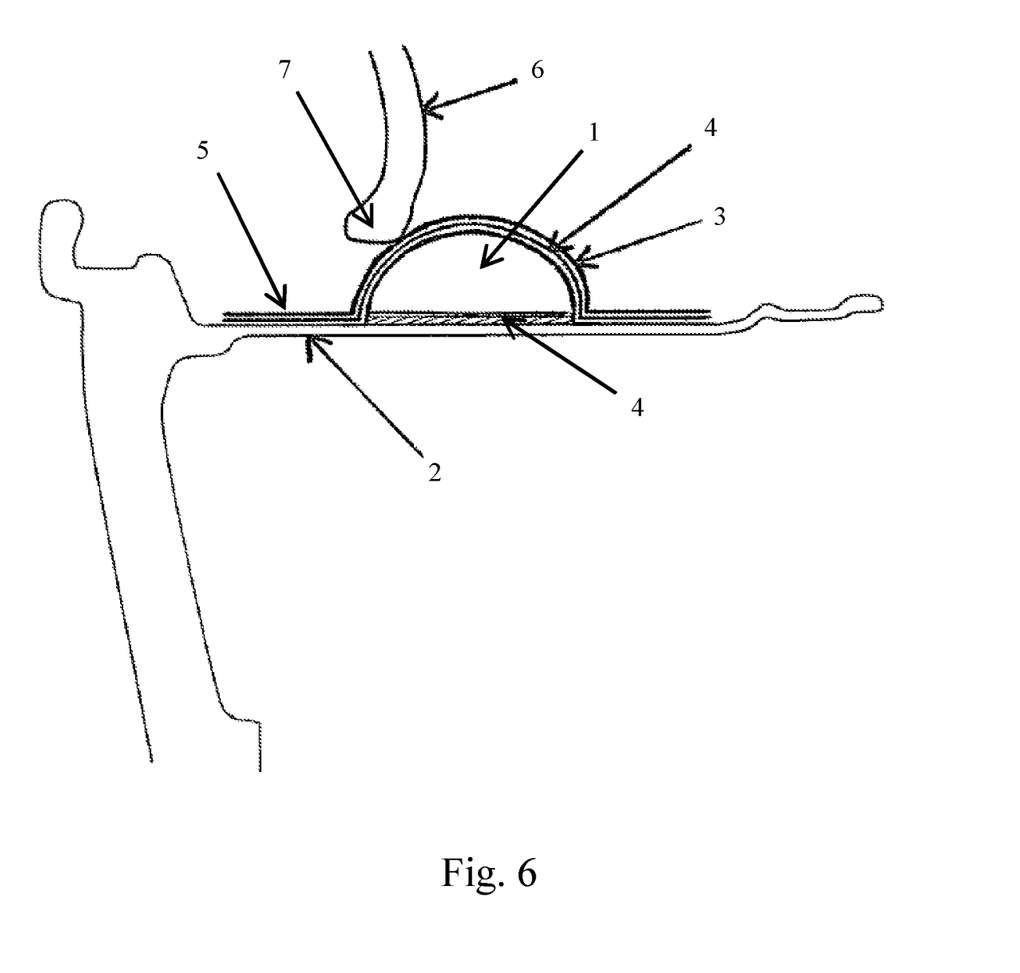
FIG. 6 is a corresponding view to FIG. 4 showing a tyre being fitted to the wheel.

When a tyre 6 is fitted to the wheel 2, the cover sits between the body 1 and the tyre 6 and presents a smoother surface to the bead 7 of a tyre than the body 1. Since the tails 5 of cover material extend past the lateral edges of the body 1, the first contact the tyre bead 7 makes on fitting tends to be with the cover material so that the bead preferentially slides over the cover material rather than dislodging it. The tyre bead 7 therefore slides over the cover material from one axial side of the wheel 2 to the other. A sufficient area of the body 1 is covered by the cover material to reduce contact and/or friction between the tyre 6 and the uncovered regions of the body 1, sufficient to prevent damage to, or the dislodging of, the body 1. The convex shape of the body 1 and, therefore, convex shape of the cover also, assists in guiding the tyre bead 7 smoothly across the body 1 and cover without damaging the body 1. The same applies during demounting of the tyre 6 from the wheel 2.

Providing an outer protective cover 3 which only partially covers the body 1 of sound absorbing material allows that the uncovered parts to absorb sound unhindered. The body 1 is therefore protected from the bead of a tyre 7 when a tyre 6 is fitted to or demounted from a wheel without significantly impairing the body's ability to absorb sound. Also, since the absorber is mounted on the rim of the wheel 2 it does not contact the tyre once the tyre 6 is fitted and so permits a liquid puncture repair to be employed in the tyre 6.

Figure 7:
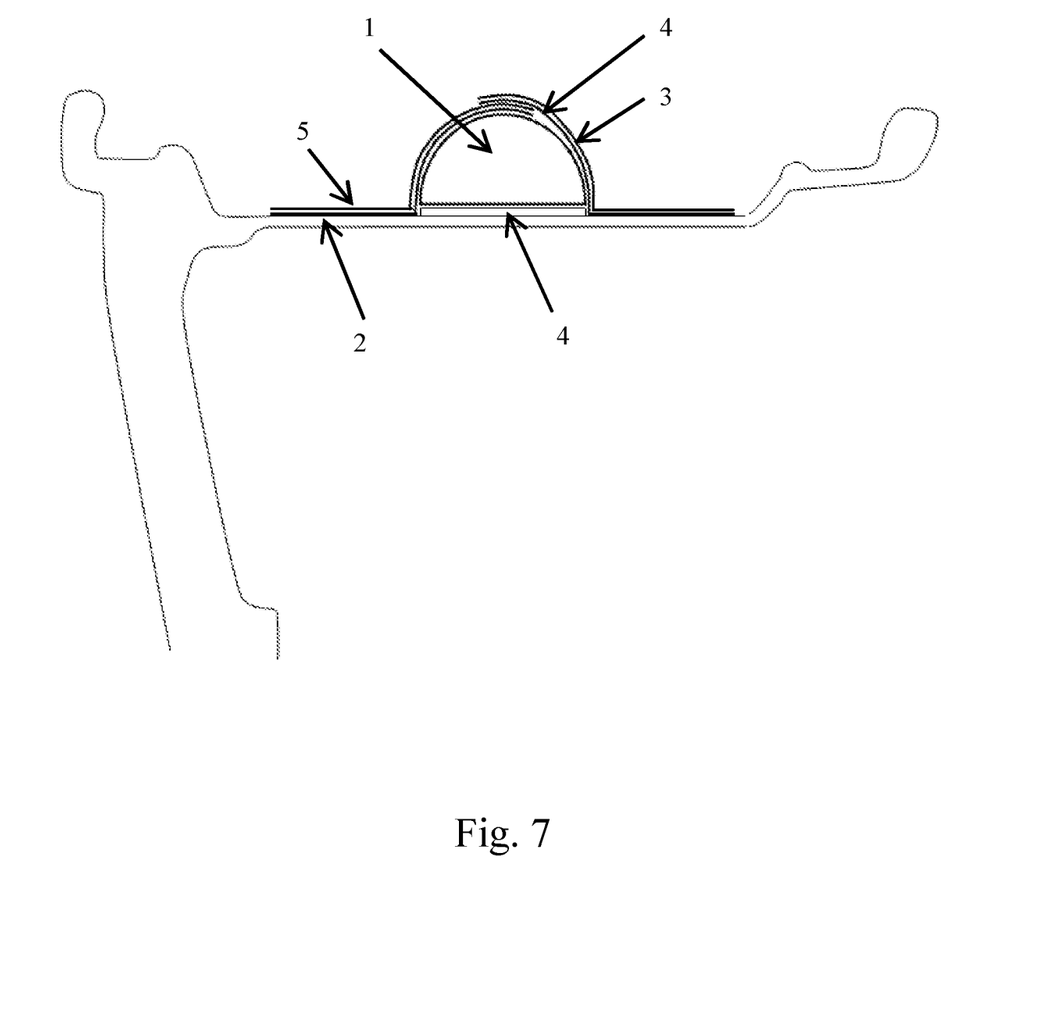
FIG. 7 is a corresponding view to FIG. 3 showing an alternative embodiment of a tyre cavity noise absorber.

In another embodiment shown in FIG. 7, each strip is formed by two pieces of cover material. Each piece has a length approximately equal to the length of the substantially convex side of the body 1. Just over half of this length extends from one lateral edge of the body 1 across the substantially convex side of the body 1 towards the opposite lateral edge of the body 1 and the remaining length forms a tail 5. A first piece extends from one lateral edge of the body 1 and forms a tail 5 of cover material extending from that edge. A second piece extends from the opposite lateral edge of the body 1 and forms a tail 5 of cover material off this other edge. The second piece is bonded to the body 1 and partially overlaps the first piece around the centre of the substantially convex side of the body 1, that is, at about the thickest part of the body 1, and is bonded to the first piece in this overlapped position.

The above embodiments are described by way of example only. Many variations are possible without departing from the scope of the invention as defined in the appended claims.

The invention claimed is:

1. A wheel fitted with a pneumatic tyre, the wheel being provided with a tyre cavity noise absorber comprising:
   a body of sound absorbing material mounted to the wheel of the wheel and tyre assembly so that a surface of the body is exposed in a tyre cavity of the wheel and tyre assembly, wherein the body of sound absorbing material comprises a porous material and said surface of the body of sound absorbing material is provided with an outer protective cover comprising a flexible plastic material and formed from spaced apart strips which, together, only partially cover said surface of the body of sound absorbing material such that the cover protects the body of sound absorbing material from a bead of a tyre as the tyre is fitted to, or removed from, the wheel and the uncovered parts of the body of sound absorbing material are free to absorb sound, at least part of the outer protective cover extends from one lateral edge of said surface of the body of sound absorbing material to an opposite lateral edge of said surface of the body of sound absorbing material, and each lateral edge of the surface lies adjacent, or abuts, the surface of the wheel to which the body of sound absorbing material is mounted, wherein the noise absorber is mounted to the wheel so that it is disposed in the tyre cavity.

2. A wheel as claimed in claim 1, wherein the outer protective cover covers between 30% and 60% of said surface of the body of sound absorbing material.

3. A wheel as claimed in claim 1, wherein the outer protective cover covers about 50% of said surface of the body of sound absorbing material.

4. A wheel as claimed in claim 1 wherein the strips forming the cover are evenly spaced apart.

5. A wheel as claimed in claim 1 wherein the strips are strips of cover material.

6. A wheel as claimed in claim 1 wherein said surface of the body of sound absorbing material is substantially convex.

7. A wheel as claimed in claim 1 wherein the body of sound absorbing material has at least one substantially flat surface, intended to be mounted to the surface of a wheel.

8. A wheel as claimed in claim 1, wherein the outer protective cover of the tyre cavity noise absorber comprises a length of sheet material part of which is affixed to the body of sound absorbing material and the remaining length of which is affixed to the wheel in order to help retain the body of sound absorbing material relative to the wheel.

9. A vehicle comprising a wheel as claimed in claim 1.

10. A method of providing a wheel and tyre assembly including the steps of:
    providing a wheel;

providing a tyre cavity noise absorber comprising a body of sound absorbing material, wherein a surface of the body of sound absorbing material is provided with an outer protective cover formed from spaced apart strips which, together, only partially cover said surface of the body of sound absorbing material and the uncovered parts of the body of sound absorbing material are free to absorb sound, and affixing it to an external circumferential surface of the wheel; and fitting a tyre to the wheel by urging a bead of the tyre onto the wheel passing it over the tyre noise cavity absorber, deforming the tyre cavity noise absorber.

11. A method as claimed in claim 10 wherein the tyre cavity noise absorber is bonded to the wheel with an adhesive.

12. A wheel as claimed in claim 1 wherein at least part of the outer protective cover extends from one lateral edge of said surface of the body of sound absorbing material to an opposite lateral edge of said surface of the body of sound absorbing material.

13. A wheel as claimed in claim 12 wherein each lateral edge of the surface is intended to lie adjacent, or abut, the surface of a wheel to which the body of sound absorbing material is intended to be mounted.

14. A wheel as claimed in claim 12 wherein at least one strip extends from one lateral edge of said surface of the body of sound absorbing material to an opposite lateral edge of sound absorbing material.

\* \* \* \* \*